US012763542B2

(12) United States Patent
Du

(10) Patent No.: US 12,763,542 B2
(45) Date of Patent: Oct. 13, 2026

(54) AMPLIFIER ARRANGEMENT

(71) Applicant: Keming Du, Aachen (DE)

(72) Inventor: Keming Du, Aachen (DE)

( * ) Notice: Subject to any disclaimer, the term of this patent is extended or adjusted under 35 U.S.C. 154(b) by 802 days.

(21) Appl. No.: 18/031,881

(22) PCT Filed: Oct. 12, 2021

(86) PCT No.: PCT/EP2021/000122
§ 371 (c)(1),
(2) Date: Apr. 14, 2023

(87) PCT Pub. No.: WO2022/078620
PCT Pub. Date: Apr. 21, 2022

(65) Prior Publication Data

US 2023/0387667 A1 Nov. 30, 2023

(30) Foreign Application Priority Data

Oct. 18, 2020 (DE) ..................... 10 2020 006 380.2
Oct. 24, 2020 (DE) ..................... 10 2020 006 522.8
Jul. 19, 2021 (DE) ..................... 10 2021 003 704.9

(51) Int. Cl.
*H01S 3/06* (2006.01)
*H01S 3/042* (2006.01)
*H01S 3/16* (2006.01)
*H01S 3/23* (2006.01)

(52) U.S. Cl.
CPC ............ *H01S 3/0604* (2013.01); *H01S 3/042* (2013.01); *H01S 3/2333* (2013.01); *H01S 3/1618* (2013.01)

(58) Field of Classification Search
None
See application file for complete search history.

(56) References Cited

U.S. PATENT DOCUMENTS 5,546,222 A * 8/1996 Plaessmann .......... H01S 3/2325 359/347
5,553,088 A 9/1996 Brauch et al.
5,615,043 A 3/1997 Plaessmann et al.
2005/0175057 A1* 8/2005 Sumida ................. H01S 3/2383 372/50.12
2006/0209918 A1 9/2006 Wang et al.
2009/0190623 A1 7/2009 Ihli et al.
(Continued)

FOREIGN PATENT DOCUMENTS

CN 104022437 A 9/2014
DE 600 34 589 T2 12/2007
(Continued)

*Primary Examiner* — Eric L Bolda
(74) *Attorney, Agent, or Firm* — Norman B. Thot

(57) ABSTRACT

An amplifier arrangement for increasing power and energy includes a multipass cell and at least one gain medium, wherein the multipass cell has concavely curved mirrors and the gain medium is arranged within the multipass cell in such a way that the pump radiation passes through the gain medium multiple times and is absorbed by the gain medium and wherein a laser beam to be amplified passes through the gain medium, characterized in that the mirrors are designed and arranged such that a White multipass cell is formed and the pump radiation and the laser beam to be amplified have large cross-sections at the positions at which mirrors, gain media and other optical components are arranged.

32 Claims, 21 Drawing Sheets

(56) References Cited

U.S. PATENT DOCUMENTS

| | | | | |
|---|---|---|---|---|
| 2011/0075688 | A1* | 3/2011 | Chiang | G02F 1/292 372/12 |
| 2011/0170172 | A1 | 7/2011 | Mizushima et al. | |
| 2012/0170607 | A1 | 7/2012 | Giesen et al. | |
| 2012/0212804 | A1* | 8/2012 | Sarkisyan | H01S 3/2325 359/347 |
| 2017/0139191 | A1 | 5/2017 | Paul | |
| 2019/0393667 | A1 | 12/2019 | Dawson et al. | |

FOREIGN PATENT DOCUMENTS

| | | | |
|---|---|---|---|
| DE | 10 2013 214 219 | A1 | 1/2015 |
| WO | WO 2018/140638 | A1 | 8/2018 |

* cited by examiner

AMPLIFIER ARRANGEMENT

CROSS REFERENCE TO PRIOR APPLICATIONS

This application is a U.S. National Phase application under 35 U.S.C. § 371 of International Application No. PCT/EP2021/000122, filed on Oct. 12, 2021 and which claims benefit to German Patent Application No. 10 2020 006 380.2, filed on Oct. 18, 2020, to German Patent Application No. 10 2020 006 522.8, filed on Oct. 24, 2020, and to German Patent Application No. 10 2021 003 704.9, filed on Jul. 19, 2021. The International Application was published in German on Apr. 21, 2022 as WO 2022/078620 A2 under PCT Article 21(2).

FIELD

The present invention relates to an amplifier arrangement for increasing power and energy.

BACKGROUND

Material processing using short and ultrashort pulse lasers is becoming increasingly important as a precise and flexible production method. High productivity requires a high average power. The average power is the product of pulse repetition rate and pulse energy. Depending on the application and apparatus technology, a high average power can be implemented only if the laser beam has a high pulse energy in conjunction with a moderate pulse repetition rate.

For gain media, such as Yb:YAG, the absorption cross-section is very small, particularly if Yb:YAG is embodied in the shape of a disk. In order to ensure an efficient absorption of the pump radiation, it is necessary for the pump radiation to propagate through the gain media multiple times.

Furthermore, high pulse energies in combination with short or ultrashort pulse durations lead to high peak pulse power densities or pulse energy densities. High peak pulse power densities and high pulse energy densities can lead to the following disadvantageous effects, for example:

- damage to the coatings and destruction of the optical unit
- nonlinear effects such as: self-phase modulation, Kerr lens, self-focusing; these cause further changes or a degradation of the temporal and spatial properties of a laser beam and damage to optical units
- stimulated Raman scattering, stimulated Brillouin scattering

SUMMARY

An aspect of the present invention is to provide an optical multipass pump arrangement for amplifiers and a multipass amplifier arrangement which are pumped efficiently and have large mode cross-sections which allow the pump radiation to be efficiently coupled into gain media, and the power and energy, in particular of pulsed laser beams, to be increased without damage to optical components.

In an embodiment, the present invention provides an amplifier arrangement for increasing power and energy which includes a multipass cell and at least one gain medium, wherein the multipass cell has concavely curved mirrors and the gain medium is arranged within the multipass cell in such a way that the pump radiation passes through the gain medium multiple times and is absorbed by the gain medium and wherein a laser beam to be amplified passes through the gain medium, characterized in that the mirrors are designed and arranged such that a White multipass cell is formed and the pump radiation and the laser beam to be amplified have large cross-sections at the positions at which mirrors, gain media and other optical components are arranged.

BRIEF DESCRIPTION OF THE DRAWINGS

The present invention is described in greater detail below on the basis of embodiments and of the drawings in which:

FIGS. 22 and 22*a* show an optical element with a heating element;

DETAILED DESCRIPTION

Figure 1:
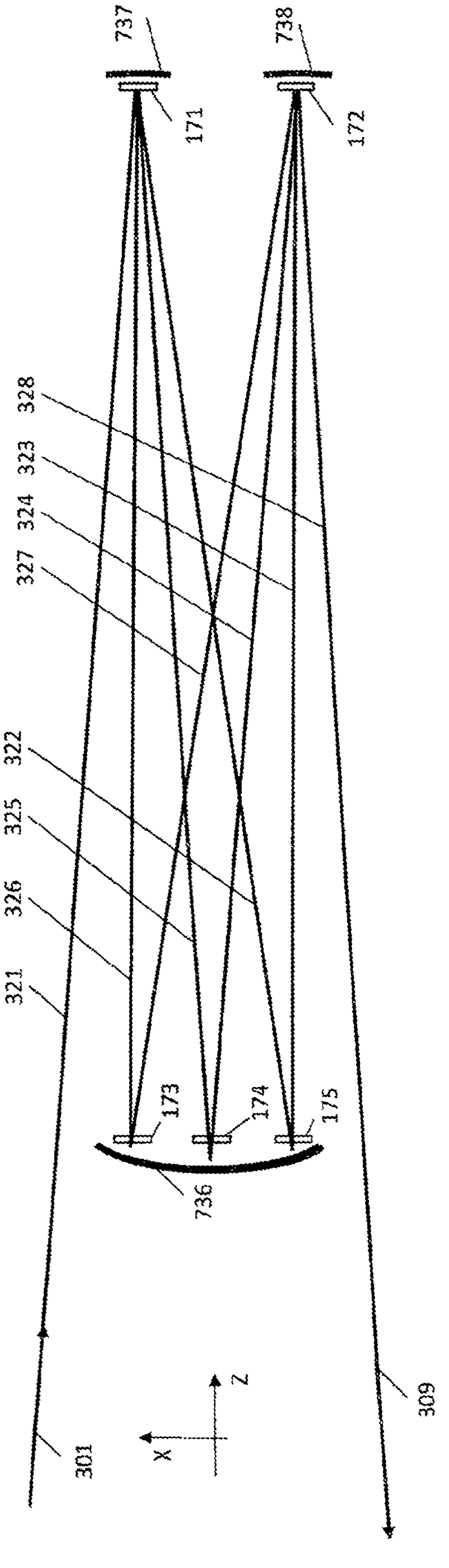
FIG. 1 shows a multipass pump arrangement having a White multipass cell.

The present invention also provides a laser arrangement and amplifier arrangement. This is characterized in that a highly reflective mirror and a partly transmissive mirror are provided, which cooperating with the multipass cell form a laser resonator, and a laser oscillator thus arises.

The amplifier arrangement for increasing power and energy according to the invention comprises a multipass cell and at least one gain medium. The multipass cell has concavely curved mirrors and the gain medium is arranged within the multipass cell. The pump radiation passes through the gain medium multiple times and is absorbed by the gain medium and a laser beam to be amplified passes through the gain medium. The mirrors are designed and arranged such that a White multipass cell is formed, and the pump radiation and the laser beam to be amplified have large cross-sections at the positions at which mirrors and gain media are arranged.

The pump radiation thus experiences a multiple pass through the gain medium, as a result of which high pulse energies are efficiently attained, such that the abovementioned effects are avoided or at least significantly reduced.

An essential concept of the invention can be seen in the fact that for efficiently pumping gain media, in particular gain media with low absorption, such as Yb:YAG in the shape of thin disks, use is made of a simple, compact multipass cell for a multiple passage of the pump radiation through the gain media and for an efficient absorption of the pump radiation by the gain media. The multipass cell is formed by the use of mirrors and optionally also lenses, which can, for example, be dimensioned and designed such that the pump radiation has large cross-sections at the positions at which lenses, mirrors, gain media and other optical components are arranged. The pump power density and pulse energy density at the positions of the optical components, such as lenses, mirrors and gain media, can thus be kept below the destruction thresholds or below the thresholds at which undesired, nonlinear effects arise.

The multipass cell is a White multipass cell.

The concave mirrors of the multipass cell can be formed by a combination of at least one mirror and at least one lens. This combination is advantageous if the effective focal length is intended to be adjustable.

In one embodiment, a reflector is provided, by which the pump radiation that was not absorbed during a first pass through the multipass cell is reflected back and passes through the multipass cell for the second time and in the opposite direction. A concave mirror can, for example, be used as reflector.

What is particularly advantageous is a gain medium in the shape of a thin disk, that is to say a disk whose diameter corresponds to approximately ten times the thickness of the disk, or greater. A first surface of the disk is convex and is highly transmissive (e.g. correspondingly coated) for the laser beam to be amplified and the pump radiation, and the second surface of the disk is coated highly reflectively (has a reflection of approximately 100%) for the laser beam to be amplified and the pump radiation, and the focal length of the disk is equal to the radius of curvature of a concave mirror.

In an alternative measure thereto, the gain medium used is a thin disk, wherein a first surface of the disk is concave and is highly transmissive, e.g. by means of a coating, for the laser beam to be amplified and the pump radiation, and the second surface of the disk is convex and is highly reflective, e.g. by means of a coating, for the laser beam to be amplified and the pump radiation. In this case, the curvatures of the surfaces are chosen such that the radii of curvature of the surfaces of the disk are approximately equal to the radius of curvature of a concave mirror.

It is also provided that the gain medium is a thin disk, wherein a first plane surface of the disk is coated highly transmissively for the beam to be amplified and the pump radiation, and the second surface of the disk is coated highly reflectively for the laser beam to be amplified and the pump radiation, wherein a positive lens is used directly upstream of the disk, and the lens is coated highly transmissively for the laser beam to be amplified and the pump radiation. The focal length of the lens is chosen and the lens is arranged in relation to the disk such that the lens and the disk together like a concave mirror reflect the pump radiation and the laser beam to be amplified. In order to dissipate the heat loss produced in the disk, the disk is fitted and thermally contacted on a heat sink.

A compact set-up is achieved if the disks are fitted on a common heat sink. Furthermore, it is advantageous if the two disks are combined to form a large disk, which is also fitted and thermally contacted on a heat sink.

The respective lens can be mounted on a displacement unit in order, by way of this displacement unit, to change the distances between the lenses and the disk and thus the effective focal length of the assemblies such that the thermal lenses in the multipass cell can be compensated for.

In order to be able to adjust the effective focal length of the lenses, a lens pair can be used instead of the individual lens. One simple implementation is that in which the lenses are respectively formed from a concave and a convex lens, wherein changing the distances between the two lenses makes it possible to compensate for thermal lenses in the multipass cell, i.e. the thermal lens effects of components within the multipass cell.

At least one optical element can be provided which consists of a medium and a heating radiation source and/or at least one heating element which is thermally contacted with the medium. The heating radiation source or the heating element is chosen such that heating radiation having a wavelength which is different than the wavelength of the pump radiation and the wavelength of the laser beam to be amplified is emitted. The medium absorbs the heating radiation and is highly transmissive for the pump radiation and the beam to be amplified. The distribution of the heating radiation is adjusted in accordance with a predefinition such that the absorption of the heating radiation results in targeted generation of a temperature distribution and accordingly a refractive index distribution in the medium in order to compensate for optical effects, such as lens effect and phase distortion, in the multipass cell.

A laser beam to be amplified can, for example, be coupled into the multipass pump arrangement for the purpose of amplification such that 4N passes of the laser beam to be amplified within the White multipass cell take place, where N is an integer. In a further advantageous embodiment, a shaping optical unit is arranged upstream of the input coupling of the laser beam to be amplified into the multipass amplifier, and transforms the laser beam to be amplified to an astigmatic beam. The shaping optical unit (261) is designed such that the transformed laser beam is approximately collimated in a plane and is convergent in a plane perpendicular thereto and has a beam waist at a central plane. The central plane ideally coincides with the focal plane of the mirror.

Such a shaping optical unit can be formed by a cylindrical lens.

In order to increase the beam quality, use is made of at least one stop and/or one stop array in the multipass cell, which have/has apertures at beam passage locations, the geometry of said apertures being adapted to the beam cross-sections of the respective beam passage locations.

Such a stop array can, for example, be positioned in the central/focal plane or in the vicinity thereof. This yields the best beam quality with little loss of effectiveness. The size of the respective apertures should correspond to 1.2 times to 2 times the beam cross-sections of a corresponding Gaussian beam.

An arrangement is also provided in such a way that the pump radiation is emitted by a beam source and is shaped by an optical unit and is coupled into the multipass pump arrangement via a dichroic mirror. In this case, the mirror is highly transmissive for the laser beam to be amplified, and the laser beam to be amplified is coupled into the multipass pump arrangement by way of the mirror. In order to achieve an optimum adaptation of the beam to be amplified and of the pump radiation, the dichroic mirror coaxially superimposes the beam to be amplified with the pump radiation. A maximum overlap of the pump radiation and of the laser beam to be amplified is thus ensured in a simple manner.

Furthermore, a reflector can be provided, which is a concave mirror and which reflects back pump radiation that was not absorbed during a first pass through the multipass cell, and correspondingly passes through the multipass cell during the second pass in the opposite direction.

A reflector or the mirror is highly reflective for the amplified beam. The amplified beam is reflected back by the mirror and passes through the multipass cell in the opposite direction and is amplified again.

In order to separate the input beam and the amplified beam, a lambda/4 retardation plate and a polarizer are used.

Moreover, it is provided that a p-polarized or an s-polarized laser beam is guided through a Faraday isolator, which maintains the p-polarization after passage of a laser beam or becomes an s-polarized laser beam after passage. The polarized laser beam subsequently passes through the polarizer and the lambda/4 retardation plate and is then circularly polarized. The amplified laser beam is reflected back into the multipass cell by the mirror and is amplified further. The amplified laser beam subsequently passes through the lambda/4 retardation plate and becomes s-polarized. The s-polarized amplified laser beam is reflected by the polarizer from a mirror and the s-polarized beam reflected from the mirror passes through the multipass cell and is amplified further. At least one of the mirrors of the multipass cell is an fs-pulse-compressing GDD (group delay dispersion) mirror or a GTI (Gires-Tournois interferometer) mirror.

The gain medium used is a liquid cell composed of dyes, a gas cell comprising $CO_2$, for example, or a solid, such as doped glass, a crystal doped with Nd ions, or Yb ions, or Tm ions, or Ho ions, or Ti ions, or a semiconductor. Moreover, the gain medium used can be a semiconductor and a gain can be generated electrically by current. In particular applications, the gain medium can be gaseous and an inversion for the purpose of amplification is generated by electrical discharge.

At least one further White multipass cell can be disposed downstream of the White multipass cell in order to form a further multipass pump arrangement and multipass amplifier arrangement with a large mode cross-section.

The laser arrangement and amplifier arrangement can, for example, be provided with a highly reflective mirror and a partly transmissive mirror which, cooperating with one of the above-described multipass cells, form a laser resonator in this way and a laser oscillator arises. At least one of the mirrors can, for example, be a cylindrical mirror. The mirror is chosen such that an astigmatic laser beam is formed within the multipass cell, wherein the astigmatic laser beam has the largest possible cross-sections at the locations where optical components, such as lenses, mirrors, in particular gain media, are arranged. In order to generate a pulsed beam, an optical switch that generates laser pulses is arranged in the laser oscillator.

Moreover, at least one frequency conversion unit can be arranged in the laser oscillator in order e.g. to double the frequency of the laser beam.

Further details and features of the invention will become apparent from the following description of exemplary embodiments with reference to the drawing. In the drawing:

Insofar as in the individual figures component parts are designated by the same reference signs or fulfil comparable functions, the description concerning one figure can be applied to another figure, without this being expressly mentioned.

FIG. 1 schematically shows one exemplary embodiment of a multipass pump arrangement having a White multipass cell, the reference sign 301 denoting pump radiation and the reference signs 171 to 175 denoting five gain media. In order to simplify the description, a rectangular xyz-coordinate system is used. The z-axis runs parallel to the beam propagation direction. The multipasses lie in the xz-plane, and the yz-plane is perpendicular to the xz-plane. The White multipass cell comprises three spherical, concave mirrors 736, 737 and 738. In the case of the exemplary embodiment shown, the three mirrors 736, 737 and 738 have the same radius of curvature. The mirrors 737 and 738 are arranged one above the other at the same z-position. The mirror 736 is arranged with respect to the mirrors 737 and 738 such that the distance is equal to the radius of curvature of the mirrors 736, 737 and 738. Accordingly, the mirrors 736, 737 and 738 form a confocal arrangement. The pump radiation 301 is coupled into the multipass cell and radiation passes 321, 322, 323, 324, 325, 326, 327, 328 arise as a result of the reflection at the mirrors 736, 737 and 738. As a result of suitable alignment of the beam 301 and the mirrors 736, 737 and 738, 4×N radiation passes are generated in the multipass cell, where N is an integer. For the purpose of amplifying a beam, one gain medium or a plurality of gain media can be arranged within the multipass cell. A total of five gain media 171, 172, 173, 174 and 175 are used in the example shown. The gain media 171 to 175 are positioned directly upstream of the respective mirrors 736, 737 and 738 since the pump radiation has the largest cross-section there.

Figure 2:
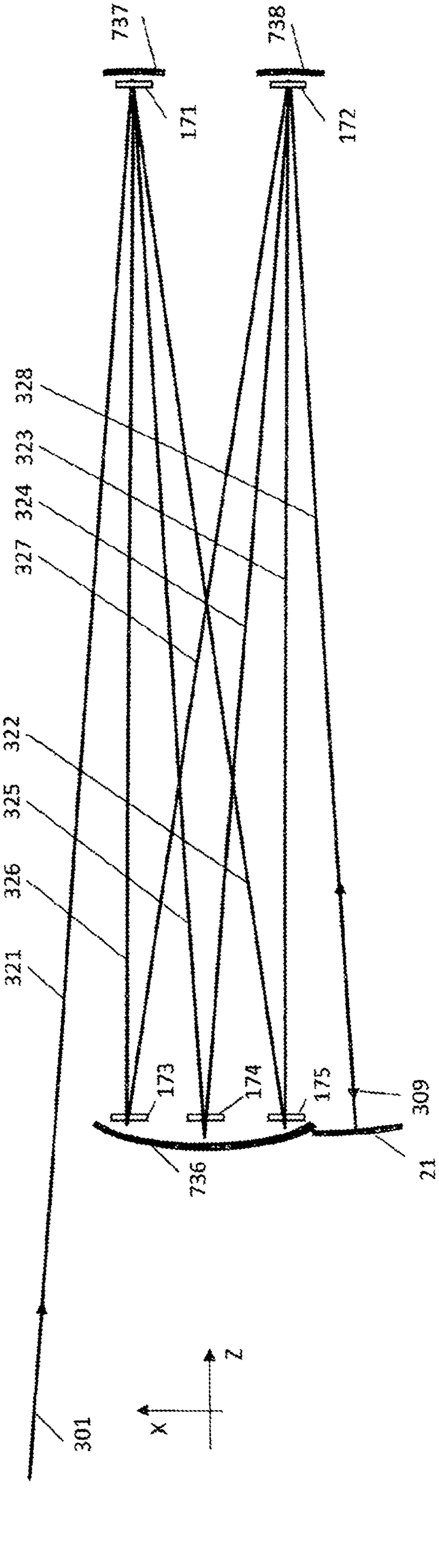
FIG. 2 shows an arrangement according to FIG. 1 having a further mirror.

For thermo-optical reasons, it is advantageous if the gain medium is embodied in disk-shaped fashion. The disk-shaped gain medium can be for example a crystal doped with Nd ions or Yb ions. Crystals doped with Yb ions have a small absorption cross-section. For an efficient absorption of the pump radiation, it is advantageous to realize as many passes of the pump radiation through the disks of the gain medium as possible. As shown in FIG. 2, this can be achieved for example by using a further mirror 21. This mirror 21 is coated highly reflectively for the pump radiation 301. The mirror 21 can, for example, have the same radius of curvature as the mirror 776. It is oriented such that the non-absorbed radiation 309 of the pump radiation 301 is reflected back and passes through the multipass cell for the second time and in the opposite direction, as a result of which the absorption of the pump radiation 301 is increased.

Figure 3A:
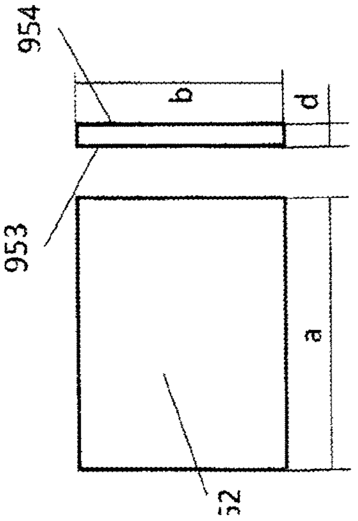
FIG. 3*a* shows a gain medium in the shape of a thin disk having a rectangular cross-section in a plan view and a side view.

It is advantageous if the gain media are formed by thin disks. FIG. 3*a* shows a plane, thin disk 962 having a rectangular cross-section, having a long edge a, a short edge b and having a thickness d. For such a thin disk 962, the ratio of the short edge b to the thickness d should be greater than 10.

Figure 3B:
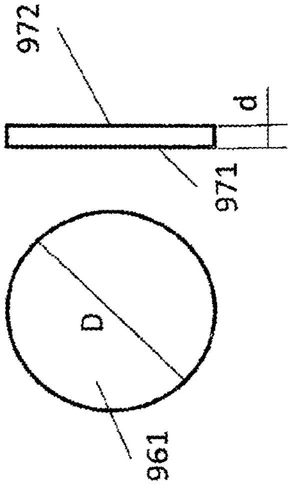
FIG. 3*b* shows a gain medium in the shape of a plane, thin, circular disk in a plan view and a side view.

FIG. 3*b* shows as an alternative a plane, circular disk 961 having a diameter D and a thickness d. D/d>10 holds true for such a thin disk, too. For the case where the gain media are solids, the pumping can be effected optically. It is advantageous if diode lasers are used for pumping purposes since a maximum efficiency with a high beam quality can thus be achieved. Furthermore, for a disk-shaped gain medium, it is advantageous to couple the pump radiation into the disks perpendicularly or at a small angle since this results in the smallest thermal lens. In this case, the entrance surfaces 953 and 971 of the disks 962 or 961 are coated highly transmissively for the beam to be amplified and the pump radiation, and the exit surfaces 954 and 972 of the disks 962 and 961, respectively, are coated highly reflectively, such that the exit surfaces act as plane mirror surfaces.

Figure 4A:
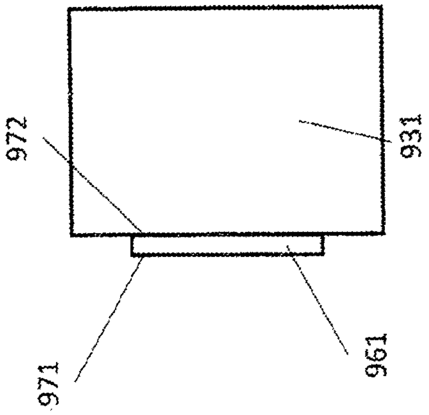
FIG. 4*a* shows a disk according to FIG. 3*a* which is fitted on a heat sink for cooling purposes.

As is illustrated in FIG. 4*a*, for the purpose of effective cooling the disk 961 is fitted to a heat sink 931 and thermally connected thereto. The heat loss that arises in the disk is thus dissipated by the heat sink and the disk is consequently cooled. In this case, the heat conduction takes place one-dimensionally and parallel to the amplifying beam, such that no thermal lenses emanate from the gain media, and the beam propagation is determined solely by the passive optical units used, such as mirrors and lenses.

In order to use such a plane disk having plane reflection surfaces as a gain medium in a multipass cell where concave mirrors are necessary, a positive lens can be arranged upstream of the disk.

Figure 4B:
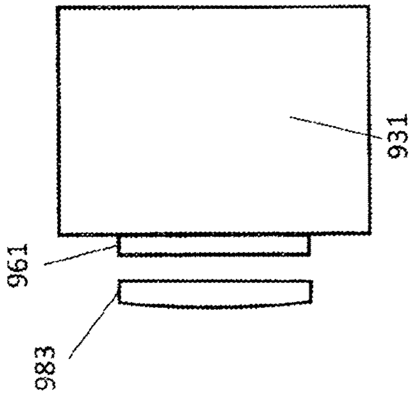
FIG. 4*b* shows an assembly comprising a positive lens and a planar disk which is fitted to a heat sink.

FIG. 4*b* illustrates an assembly comprising a positive lens 983 and a plane disk 961 which is fitted to a heat sink 931.

Figure 5B:
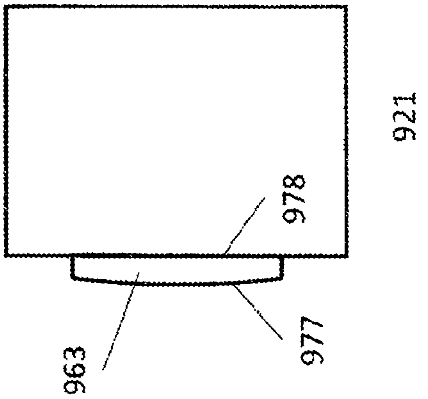
FIG. 5*b* shows the disk from FIG. 5*a*, to the plane reflection surface of which a heat sink is additionally fitted.
Figure 5A:
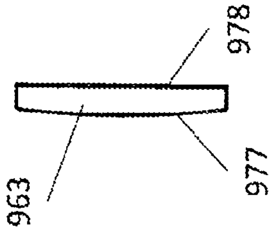
FIG. 5*a* shows a disk having a convexly curved entrance surface and a plane reflection surface.

In order to reduce the number of optical components, the disk 963 as is illustrated in FIG. 5*a*, can be fashioned such that it has a convexly curved entrance surface 977 and a plane exit surface 978. In this case, the convexly curved entrance surface 977 acts like a lens having a focal length that corresponds to the radius of curvature of a corresponding mirror of the White multipass cell. The convexly curved surface 977 is coated highly transmissively for the pump radiation and the beam to be amplified, and the plane surface 978 is coated highly reflectively.

FIG. 5*b* shows how the disk 963 is connected to a heat sink 921 for cooling purposes at the plane surface 978 of said disk.

Figure 6B:
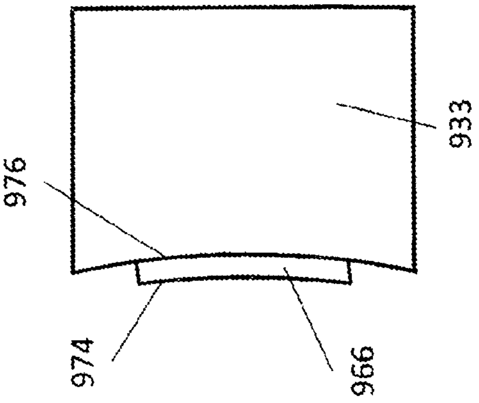
FIG. 6*b* shows the disk from FIG. 6*a* which is connected to a heat sink by way of its convexly curved surface.
Figure 6A:
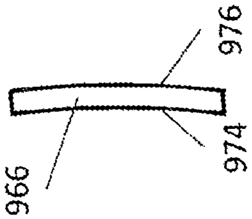
FIG. 6*a* shows a further embodiment of a disk shaped in the form of a meniscus lens.

FIG. 6*a* shows a further embodiment of a disk 966, which is shaped like a meniscus lens, having a concavely curved entrance surface 974 and a convexly curved exit surface 976. Since the disk 966 is very thin, the radius of curvature of the two surfaces 974, 976 can be chosen to be the same. In this case, the radius of curvature of the convexly curved surface 976 corresponds to the radius of curvature of the mirrors of the White multipass cell. The concavely curved surface 974 is coated highly transmissively for the pump radiation and the beam to be amplified, and the convexly curved surface 976 is coated highly reflectively.

For the purpose of cooling the disk, use is made of a heat sink 933 having a concavely curved contact surface, as is illustrated in FIG. 6*b*. Ideally, said surface has the same radius of curvature as the convexly curved surface 976 of the disk 966 and the disk is attached to the heat sink 933 by way of its convexly curved surface 976 and is thus cooled.

Figure 7:
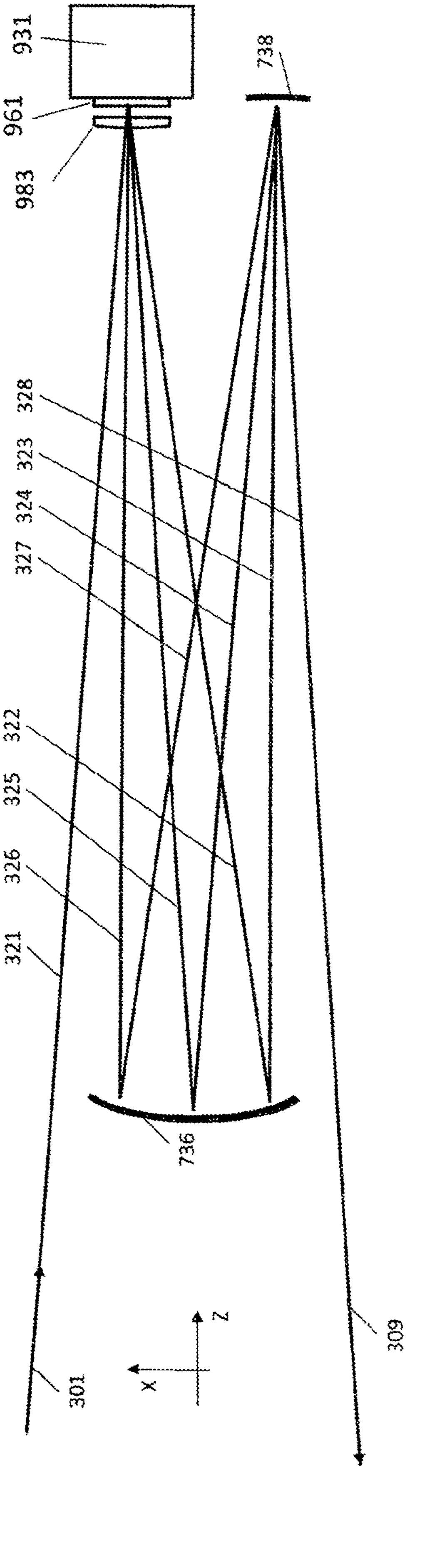
FIG. 7 shows a further multipass pump arrangement, the set-up of which is based on the arrangement shown in FIG. 1.

FIG. 7 shows one example of a multipass pump arrangement, the basic set-up of which is based on the arrangement illustrated in FIG. 1. This arrangement comprises an assembly having a lens 983, a disk-shaped gain medium 961 and a heat sink 931, which is used in a White multipass cell. This assembly fulfils the functions of the gain medium 171 and of the mirror 737 in FIG. 1. Upon each reflection, the beam passes through the lens 983 and the disk 369 twice. It is assumed that the disk 369 has no thermal lens effect. In this case, the focal length of the lens 983 is chosen such that it is equal to the radius of curvature of the corresponding mirrors, for example mirror 737 (see FIG. 1), of the multipass cell.

Figure 8:
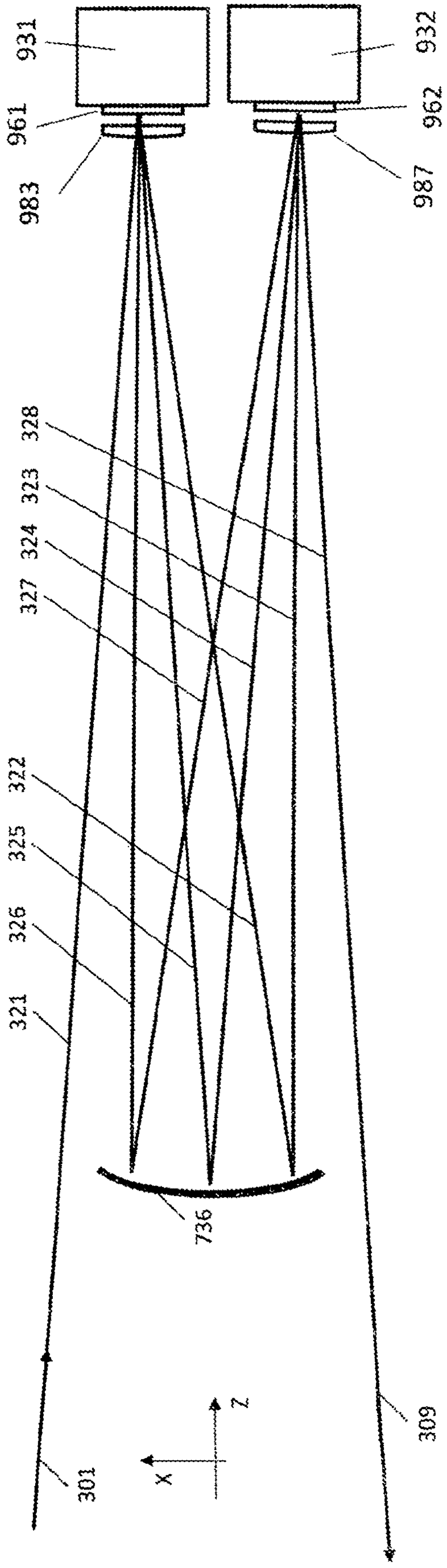
FIG. 8 shows a further multipass pump arrangement.

FIG. 8 shows a further example of a multipass pump arrangement according to the invention. The basic set-up of this multipass pump arrangement is based on the multipass pump arrangement illustrated in FIGS. 1 and 7. By comparison with the embodiment in FIG. 7, a further assembly having a lens 987, a disk-shaped gain medium 962 and a heat sink 932 is added and is used in a White multipass cell. This assembly replaces the combination of the gain medium 172 and the mirror 738 in FIG. 1. With each reflection, the beam passes through the lenses and the disks twice. It is assumed that the disk has no thermal lens effect, the focal length of the lens 987 being chosen such that it is equal to the radius of curvature of the corresponding mirrors 738 from the multipass cell.

Figure 9:
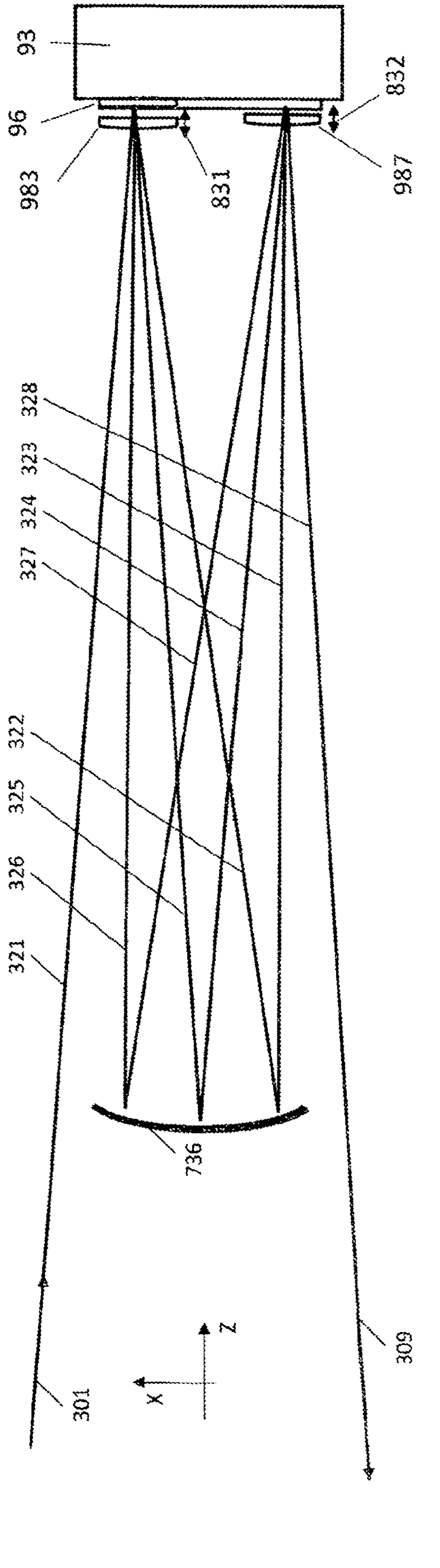
FIG. 9 shows a modified embodiment by comparison with FIG. 8.

FIG. 9 shows that the two disks 961 and 962 are combined in a larger disk 96. The disks 961 are connected to a respective heat sink 931 (see FIG. 8) or, having been combined in a single disk 96, are connected to one heat sink 93 (see FIG. 9).

Figure 9A:
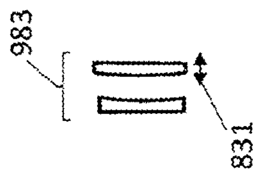
FIG. 9*a* schematically shows an arrangement of a lens pair consisting of a concave lens and a convex lens, wherein the convex lens is mounted on a displacement unit.

As indicated by the double-headed arrows 831 and 832 in FIGS. 9 and 9*a*, the respective lens 983, 987 can be arranged on a displacement unit, by means of which the distances between the lenses 983, 987 and the disk 961, 962 can be altered in order thus to change the effective focal length of the assemblies such that the thermal lenses in the multipass cell are compensated for. FIG. 9*a* furthermore indicates that a lens pair can be used as a positive lens 983, said lens pair consisting of a negative or positive lens in a simple embodiment.

Figure 10:
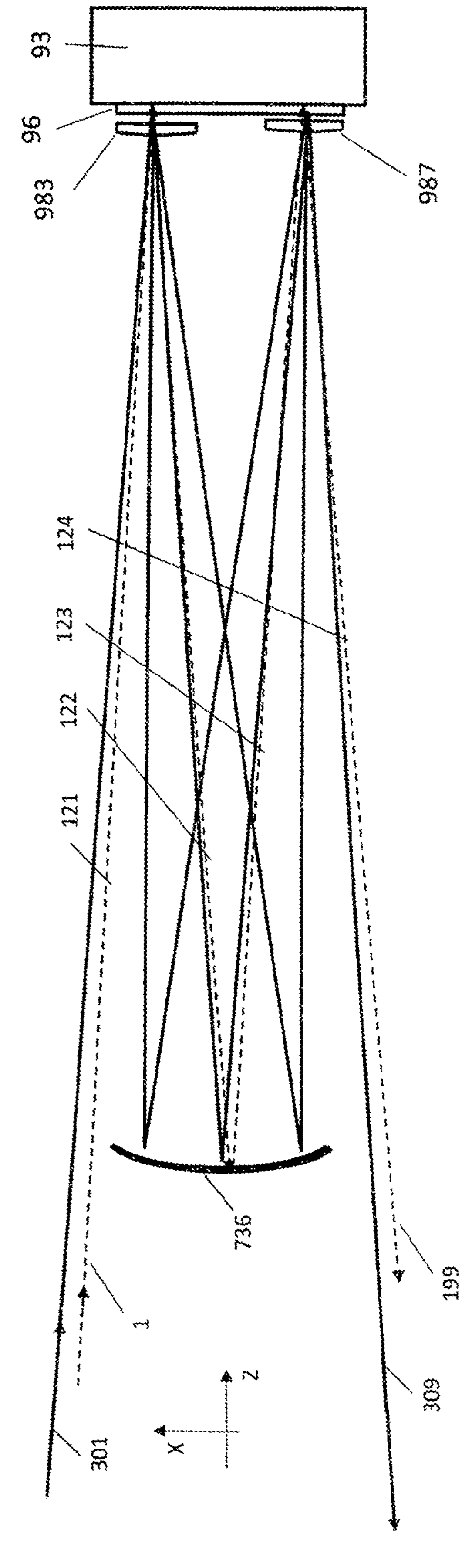
FIG. 10 shows an embodiment based on that shown in FIG. 9, where the beam to be amplified is not coupled in coaxially with the pump radiation in the multipass arrangement.

FIG. 10 shows a further embodiment of an amplifier arrangement according to the invention. A beam 1 to be amplified is coupled into the multipass pump arrangement illustrated in FIG. 9, for example. In this case, the beam 1 to be amplified is coupled in such that it passes through the White multipass cell four times and is amplified. By varying the input coupling angle and the input coupling position of the beam 1, it is possible to realize 4N passes of the beam 1, where N is an integer, within the White multipass cell in order to attain a very high gain. If the disk 96 has a thermal lens effect, its effective focal length is chosen such that it is equal to the radius of curvature of the corresponding mirrors.

In practice, the disk has power-dependent lens effects. Furthermore, other optical components in the multipass cell, such as the dichroic mirror 61 (for example FIG. 17), can cause thermo-optical effects on account of the high-power loading. In this case, the thermal lens effect can change in a power-dependent manner. The operating parameters, such as the power/energy, are considerably restricted as a result. In order to solve the problem, for example, the lenses 983 and 987 can be mounted on a displacement unit, as is indicated by the double-headed arrow 831 in FIGS. 9, 9*a*. Changing the distances between the lenses and the disk makes it possible to change the effective focal length of the assemblies comprising lenses and disks in order thereby to compensate for the thermal lenses.

Instead of the individual lens, it is also possible to use a lens group to compensate for the thermal lenses, the focal length of which can be varied. In this case, at least one of the lenses is mounted on a displacement unit. Displacement makes it possible to vary the effective focal length of the lens group in accordance with a predefinition.

Figure 21A:
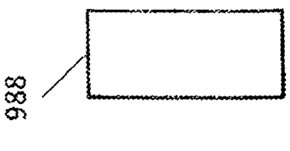
FIGS. 21*a* and 21*b* show one embodiment of a lens group.
Figure 21B:
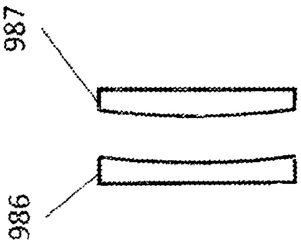

As shown in FIGS. 21*a* and 21*b*, a very simple embodiment of a lens group 988 consists of a concave lens 986 and a convex lens 987. The two lenses 986 and 987 have comparable absolute values of the focal lengths. The effective focal length of the lens pair can be changed by adjusting the distance between the two lenses 986 and 987, thereby compensating for the thermal lens effects of components within the multipass cell.

To compensate for the thermal lenses and the phase front distortion within the multipass cell, it is also possible to use an optical element whose optical properties, such as e.g. focal length, are varied in a targeted manner.

Figure 22C:
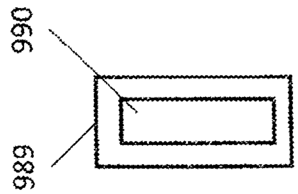
FIGS. 22*b* and 22*c* show the dependence on the refractive index with varying temperature distribution.

One example of an optical element consists in using a medium 989 (see FIG. 22*a*) which is transmissive for the pump radiation and for the laser beam to be amplified. FIG. 22*b* shows that the refractive index in the medium can be influenced e.g. in a targeted manner by way of a temperature distribution T(y). In the case of a medium which absorbs radiation having a defined wavelength which is different than the wavelength of the pump radiation and of the beam to be amplified, e.g. the temperature distribution can be generated by a defined radiation field in the medium. Adjusting the radiation field thus makes it possible to generate the desired refractive index distribution n(y) in the medium in order to compensate for the thermo-optical effects, such as thermal lenses and thermally and/or thermomechanically induced phase front distortion, in the multipass cell. This is also illustrated graphically by FIG. 22*c*.

Figure 22:
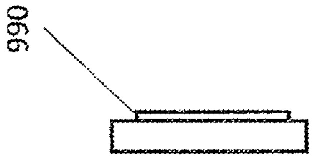
Figure 22B:
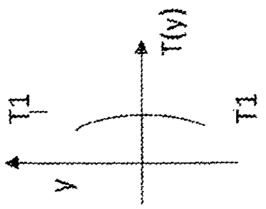
Figure 22C:
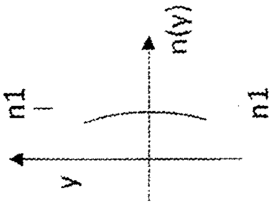

Furthermore, at least one thermal element 990 can be arranged around the medium (see FIG. 22). The thermal element 990 can be e.g. a heating element or a cooling element. By means of the thermal element 990, a temperature distribution is generated in the medium in a targeted manner and the phase of the pump radiation and of the beam to be amplified is thus influenced in a targeted manner.

Figure 11:
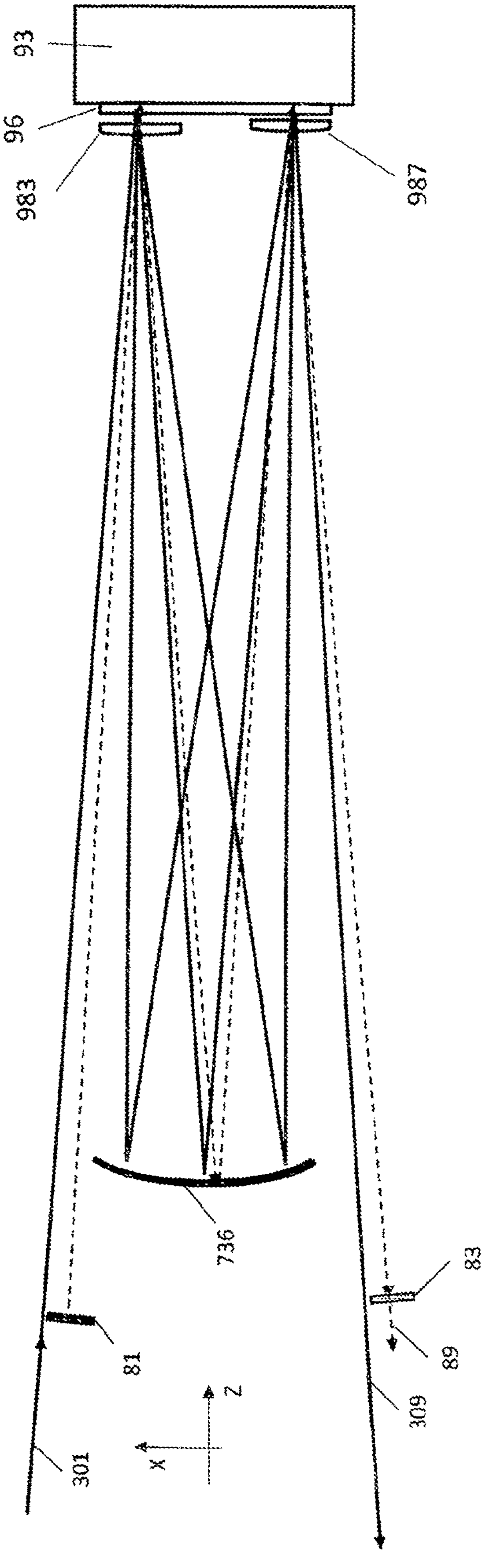
FIG. 11 shows an oscillator arrangement based on the arrangement from FIG. 10.

FIG. 11 shows an oscillator arrangement based on the amplifier arrangement illustrated in FIG. 10, in which a highly reflective mirror 81 and a partly transmissive mirror 83 are used. The two mirrors 81 and 83 cooperating with the multipass cell form a laser resonator, and cooperating with the gain media situated in the multipass cell form a laser oscillator, which generates a laser beam 89. Plane or curved mirrors can be used as mirrors 81 and 83. It is advantageous if at least one of the two mirrors 81 and 83 is cylindrical.

Figure 12:
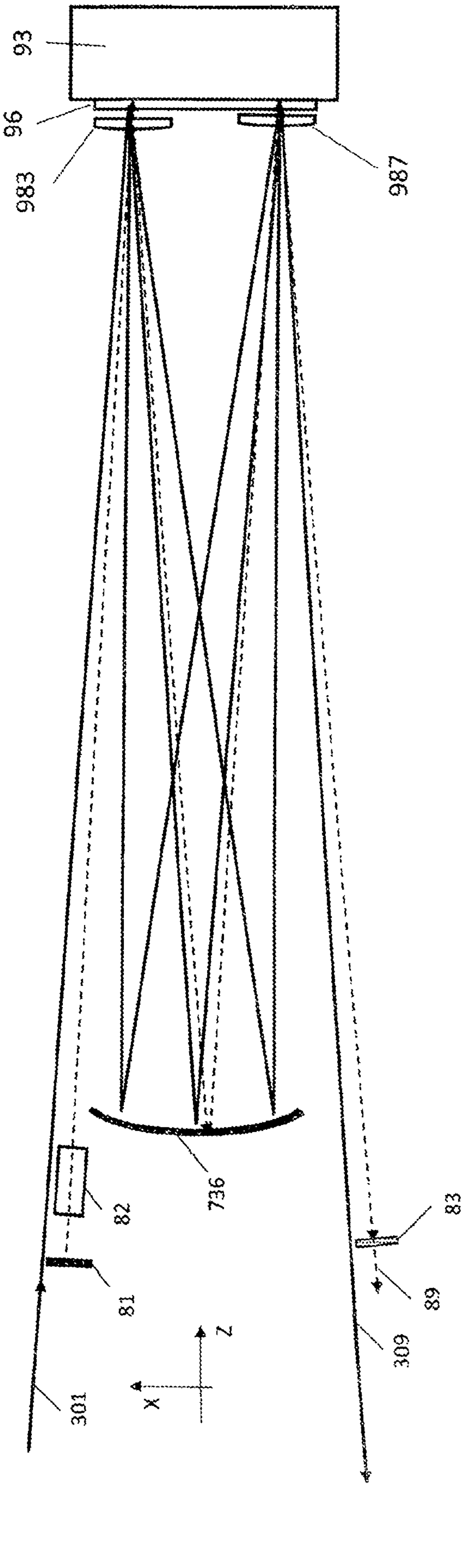
FIG. 12 shows an arrangement with mode matching.

FIG. 12 shows an embodiment in which a spherical or cylindrical lens 82 is used for mode matching. The objective when selecting the mirrors and/or lenses is for an astigmatic laser beam to be formed within the multipass cell. It is furthermore advantageous that the astigmatic beam has the largest possible mode cross-sections at the locations where optical components, such as lenses, mirrors, in particular gain media, are situated.

Figure 13:
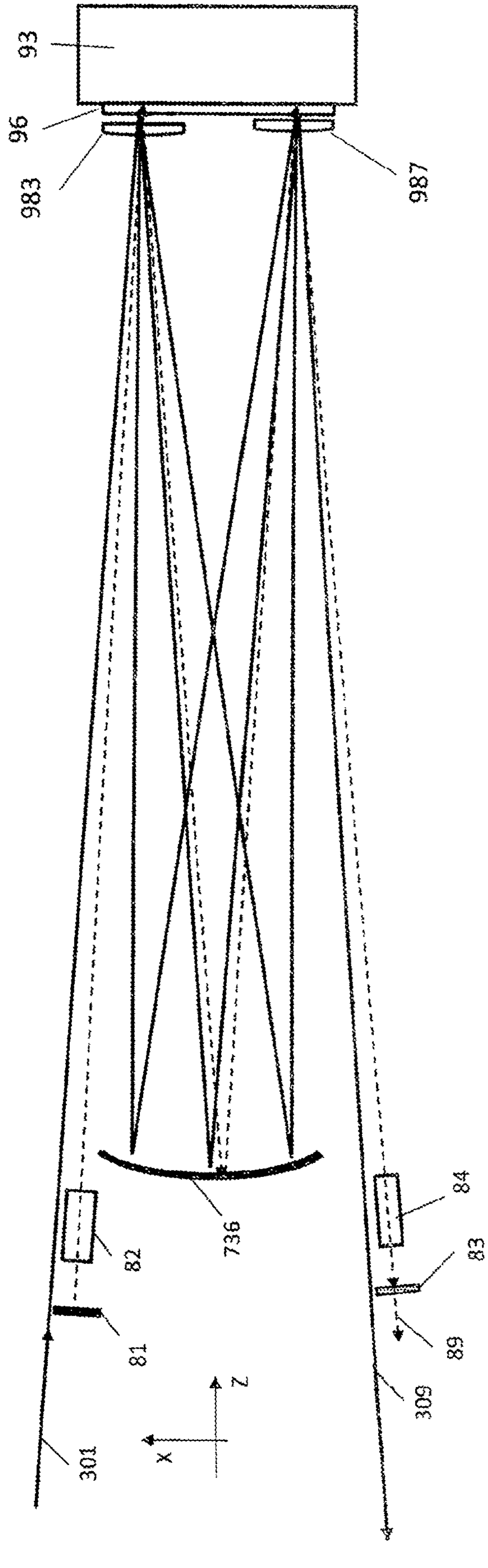
FIG. 13 shows a laser oscillator having an optical switch for generating laser pulses.

FIG. 13 shows a laser oscillator comprising an optical switch 84 for generating laser pulses. Examples of optical switches are acousto-optic or electro-optic switches.

Figure 14:
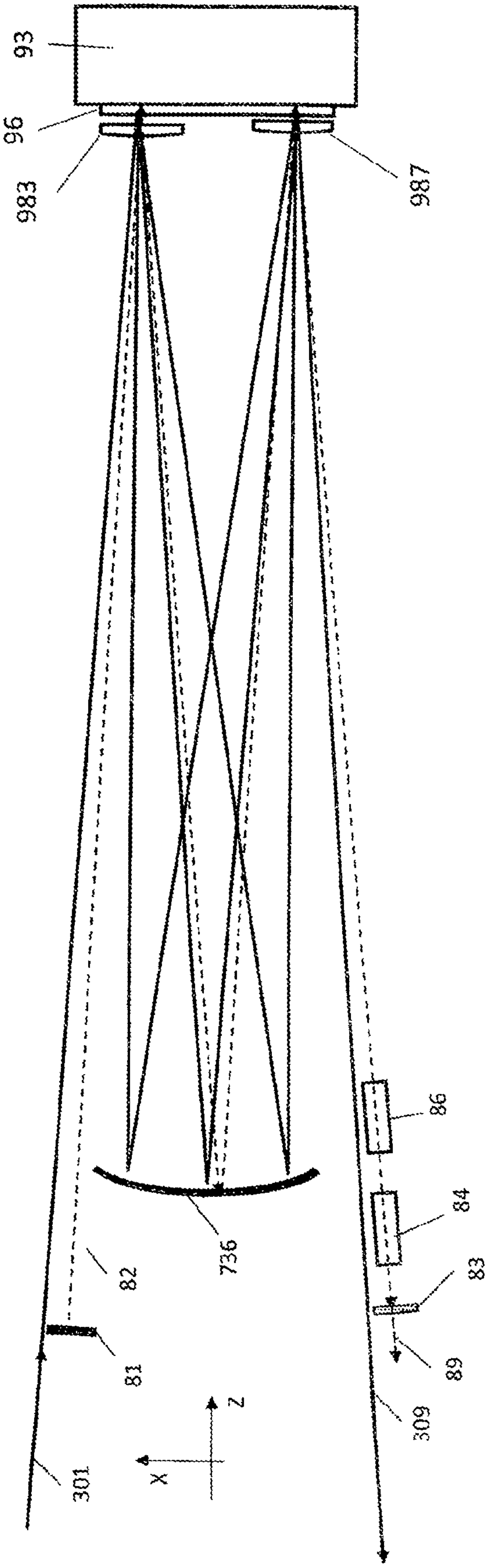
FIG. 14 shows a laser oscillator according to FIG. 13 having a frequency conversion unit.

FIG. 14 shows a laser oscillator in which a frequency conversion unit 86 is present. Examples of the frequency conversion unit 86 are, inter alia, frequency doubler, summation frequency generator, optical parametric generator, etc.

The beam 1 to be amplified can be a stigmatic beam or an astigmatic beam. In order to minimize the maximum intensity within the multipass cell, it is advantageous to shape the beam 1 to be amplified to form an astigmatic beam having defined characteristics and then to couple it into the multipass cell.

Figure 24:
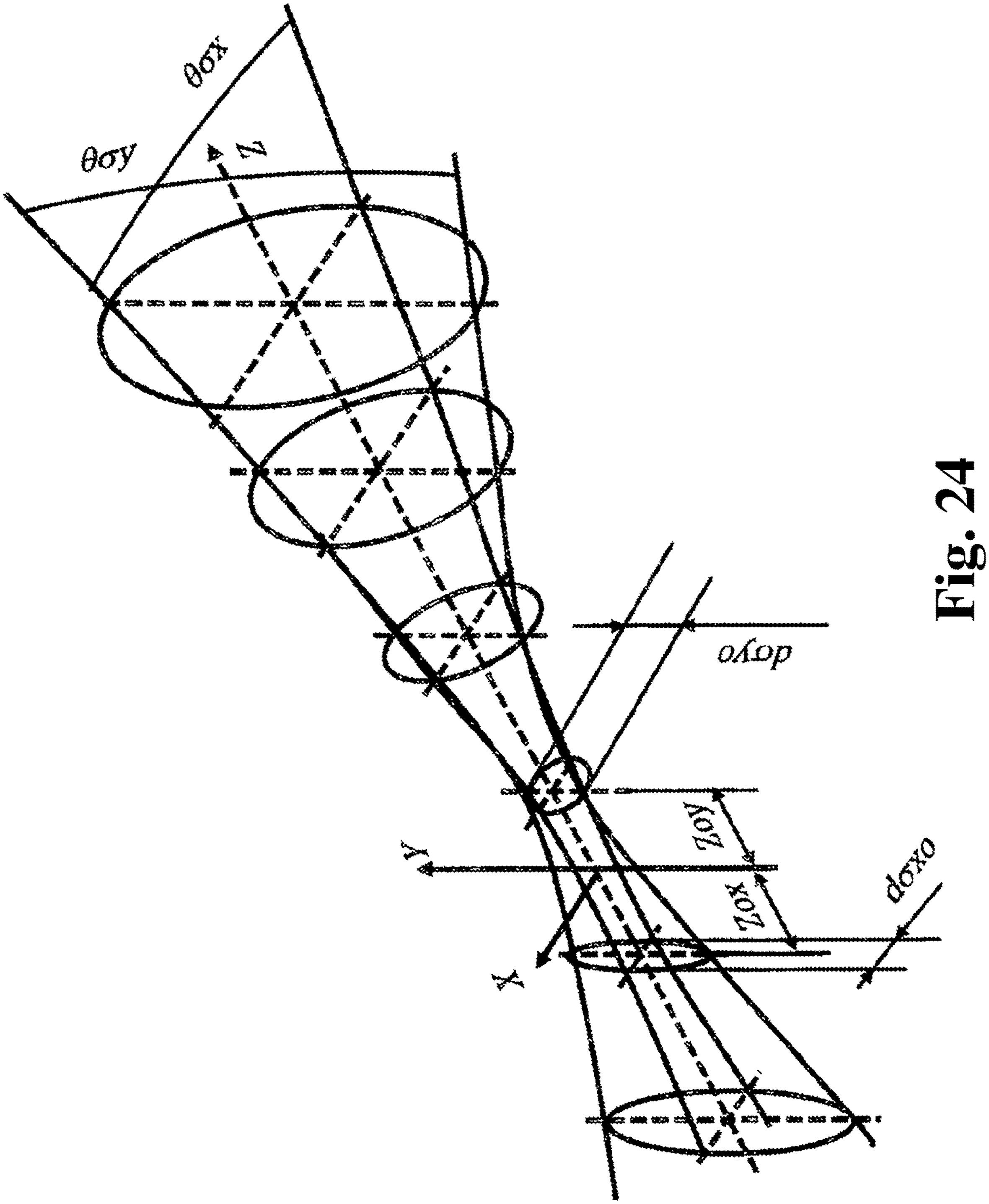
FIG. 24 schematically shows one example of a simple astigmatic beam.

Use of, inter alia, cylindrical optical units, such as cylindrical lenses, cylindrical mirrors or prisms, enable a stigmatic beam to be reshaped to form a simple astigmatic beam. FIG. 24 shows one example of a simple astigmatic beam. The simple astigmatic beam propagates in the z-direction. In the xz-plane, the beam has a waist dσx0 that lies at Z0x. In the yz-plane, the beam waist is dσy0 and lies at the location Z0y. In the case of a simple astigmatic beam, the optical unit can be positioned such that the power density on the optical unit and at the focus is considerably reduced.

In order to further scale the power and pulse energy, it is advantageous that the beam to be amplified is transformed into an astigmatic beam before it is coupled into the multipass cell.

Figure 15A:
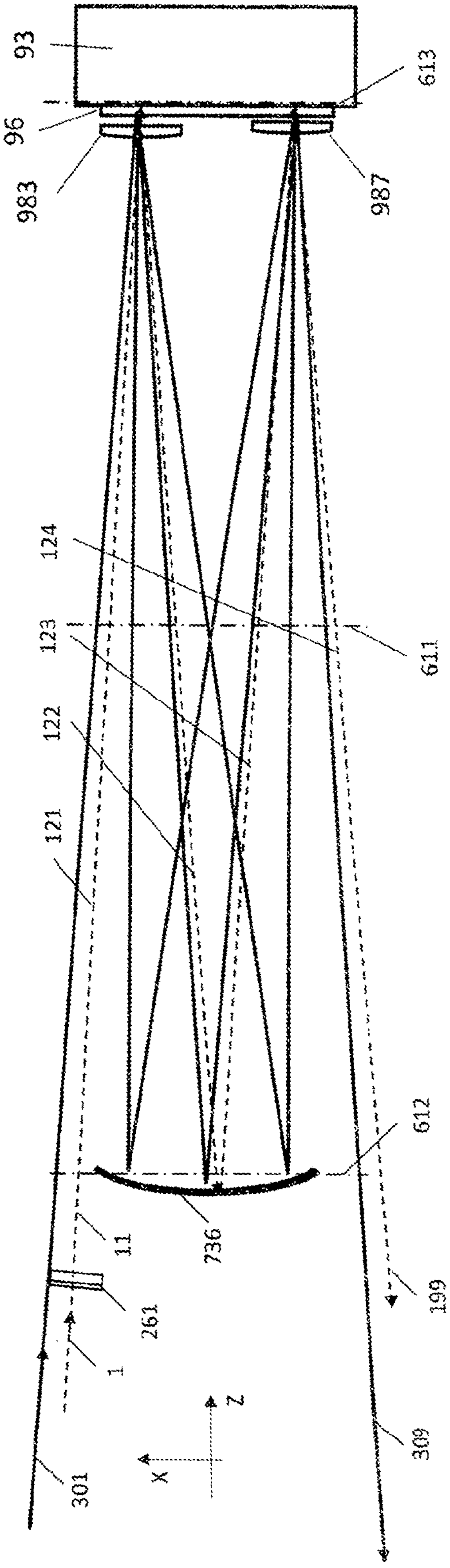
FIG. 15*a* shows a further multipass cell where use is made of an optical unit for transforming the laser beam to be amplified to a defined astigmatic beam.

Such an embodiment is shown in FIG. 15*a*. The multipass cell consists of a spherical concave mirror 736 and two assemblies, wherein one assembly consists of a lens 983, a disk 96 and a heat sink 93, and another assembly consists of a lens 987, the disk 96 and the heat sink 93. The two assemblies each act like a concave mirror having a radius of curvature like the mirror 736. The mirror 736 and the two assemblies are arranged with respect to one another such that the distance is equal to the radius of curvature of the mirrors. A White multipass cell is thus formed. The dash-dotted line symbolizes the central plane 611 of the multipass cell. In this specific case, the central plane is simultaneously the focal plane of the White multipass cell. An optical unit 261 is used for the input coupling of the beam 1 to be amplified. The optical unit 261 transforms the beam 1 to be amplified into an astigmatic beam 11, which is coupled into the multipass cell. In the example shown, four beam paths 121, 122, 123 and 124 arise within the multipass cell. In principle, the beam 1 can have an arbitrary, e.g. an elliptical, cross-section. For a simplified illustration it is assumed that the beam 1 has a circular cross-section. The shaping optical unit 261 is designed and arranged such that the shaped beam 11 is approximately collimated in the yz-plane and, in the xz-plane, the beam waist of the input beam lies on the central plane 611. The beam 121 passes through the gain medium 96 and is amplified in the process. After reflection by the disk 96 and after passing through the lens 983 twice, the beam is collimated in the xz-plane, while the beam is focused in the yz-plane, such that the reflected beam 122 is an astigmatic beam which is approximately parallel in the xz-plane and, in the yz-plane, has a beam waist in the central plane 611, the cross-section of which changes from circular to elliptical and to circular again during propagation. In this case, the beam passes through the gain medium for the second time and is amplified further.

Figure 15D:
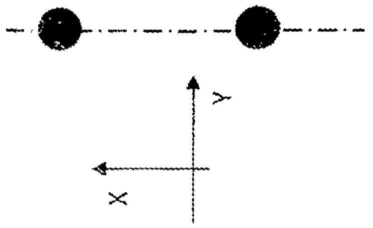
FIGS. 15*b*, 15*c* and 15*d* show beam cross-sections at the various planes assigned to FIG. 15.
Figure 15C:
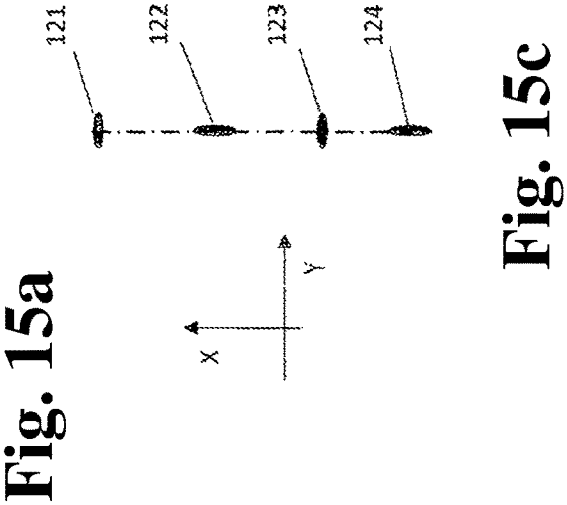
Figure 15B:
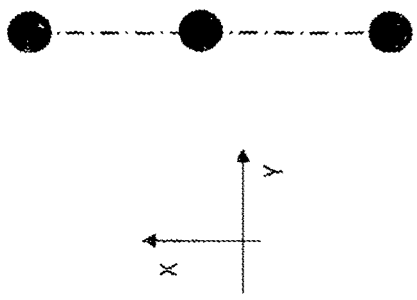

For a stigmatic beam 1, it is advantageous that for the optical unit 261 use is made of a cylindrical lens whose focal length is equal to the focal length of the mirrors and whose focus lies in the focal plane 611. The beam 122 is reflected by the mirror 736 to form a beam 123. In this case, the beam is focused in the xz-plane and collimated in the yz-plane. In the xz-plane, the beam 123 has a focus in the focal or central plane 611 and thus has an elliptical beam cross-section in the central plane 611. The elliptical cross-section of the beam 123 is at right angles with respect to the cross-section of the beam 122. The beam 123 is reflected by the disk 96 and passes through the lens 987 twice and the beam 124 arises. In this case, the beam is collimated in the xz-plane and focused in the yz-plane. In this way, the beam is reflected back and forth and passes through the gain media multiple times. The beam cross-section changes from elliptical to circular and from circular to elliptical again. FIG. 15*b* shows the cross-sections of the beams at the mirror 736. FIG. 15*c* illustrates the beam cross-sections in the central plane 611. FIG. 15*d* shows the beam cross-sections at the disk 96. It is evident that the beam at the mirror and at the disk has large and approximately circular cross-sections.

For an fs laser, it is advantageous that at least the mirror 736 is a GDD mirror (group delay dispersion mirror) or a GTI mirror (Gires-Tournois interferometer mirror). The dispersion of the mirror is chosen such that the dispersion caused by the medium and the air is compensated for and the pulse length is shortened on account of incremental broadening of the beam spectrum after each pass.

In order to increase the beam quality, use can be made of one or a plurality of stops and/or stop arrays in the multipass cell. It is advantageous if a stop array is positioned in the focal plane 611, or in the vicinity of the focal plane 611. The stop arrays have apertures whose geometry is adapted to the beam cross-sections of the respective beam passage locations.

Figure 16C:
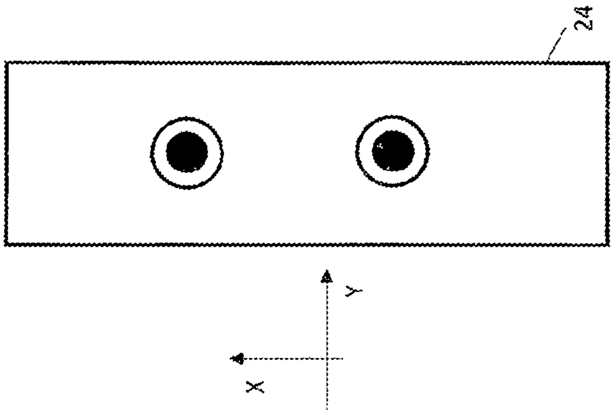
FIGS. 16*a*, 16*b* and 16*c* show stop arrays at the positions indicated in FIGS. 15*a, b, c, d;*
Figure 16B:
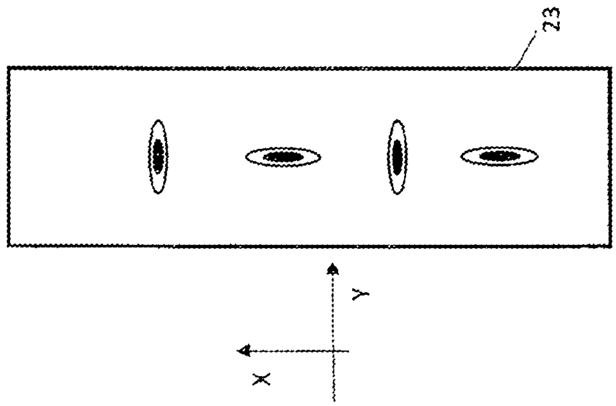
Figure 16A:
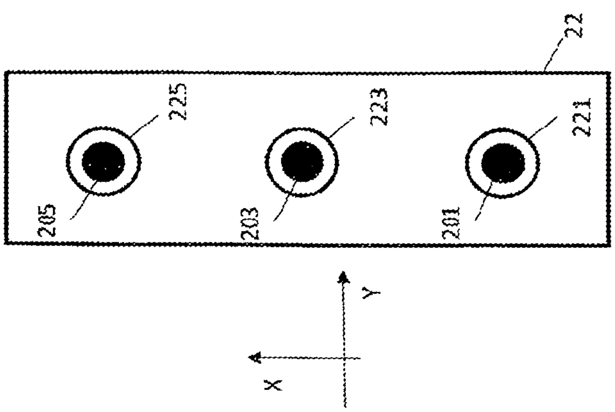

FIGS. 16*a*, 16*b* and 16*c* show examples of stop arrays for the White multipass cell illustrated in FIG. 15*a*.

FIG. 16*a* shows one example of a stop array which is positioned in the plane from the mirror 736. This stop 22 has three beam passages 201, 203, 205 and accordingly has three apertures 221, 223, 225. It holds true as a rule that the size of the apertures ought to amount to 1.2 times to 2 times the beam cross-sections of the corresponding Gaussian beam. FIGS. 16*b* and 16*c* show by way of example the positionings of the apertures upstream of a stop array for the focal plane 611 and respectively at the disk 96.

Figure 17:
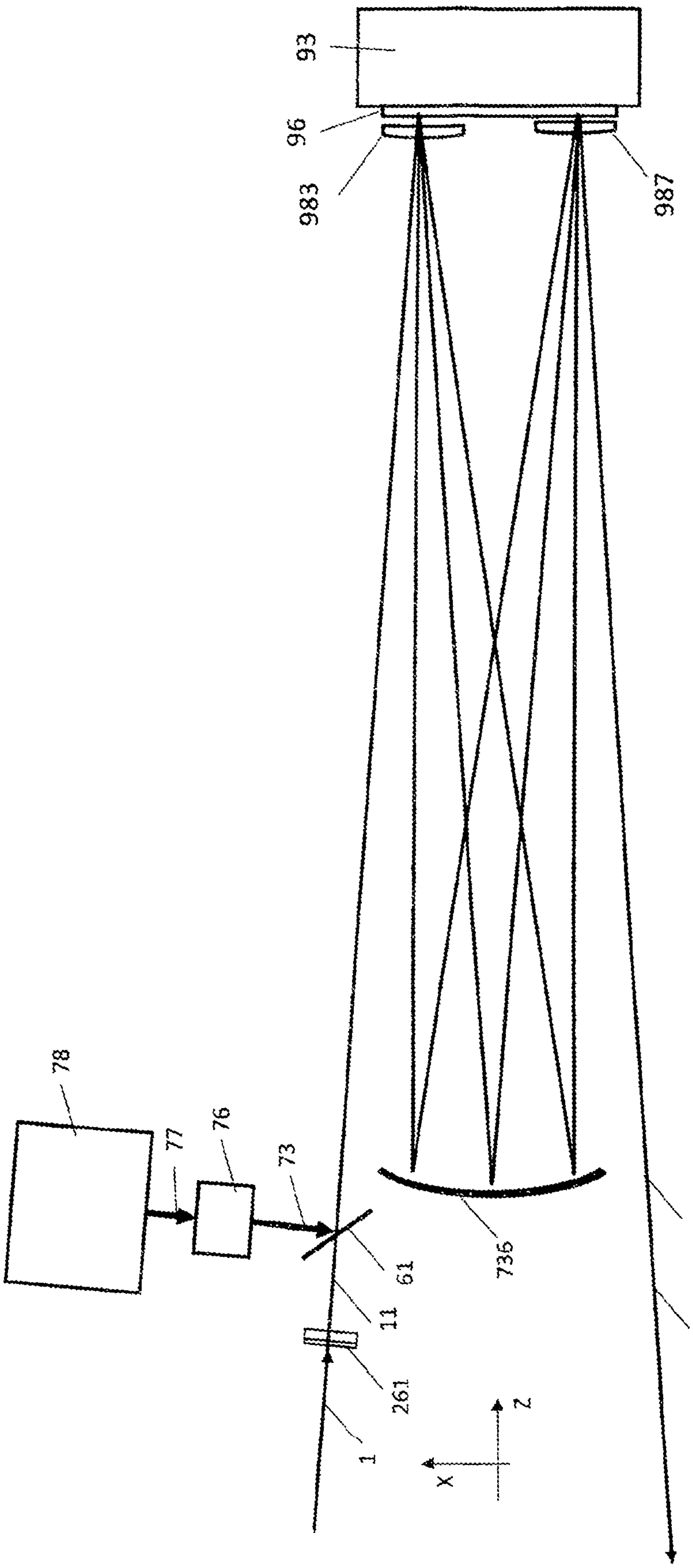
FIG. 17 shows an exemplary amplifier arrangement according to the present invention.

FIG. 17 shows a further amplifier arrangement according to the invention. A beam source 78 is used for the purpose of pumping. The radiation 77 emitted by the beam source 78 is shaped by an optical unit 76 to form pump radiation 73 such that the pump radiation at the disk has a size comparable to or the same as that of the beam to be amplified. The mirror 61 is a dichroic mirror. The dichroic mirror coaxially superimposes the beam 11 to be amplified with the pump radiation 73. The mirror 736 and the exit surface of the disk 96 are coated such that they are highly reflective both for the laser beam 11 to be amplified and for the pump radiation 73. Furthermore, the lenses 983 and 987 and the entrance surfaces of the disk 96 are coated highly transmissively for the laser beam 11 to be amplified and for the pump radiation 73. In this embodiment, the pump radiation 73 passes coaxially with the laser beam 11 to be amplified. In this regard, a maximum overlap of the pump radiation and of the laser beam to be amplified is ensured in a simple manner, with the result that the maximum utilization of the gain is ensured.

On the basis of the above-described amplifier arrangements having a multipass cell, laser oscillators can also be formed by adding resonator mirrors, such as the mirrors 81 and 83 in FIG. 14.

Disk-shaped gain media can be crystals doped with Nd ions or Yb ions, for example. Crystals doped with Yb ions have a small absorption cross-section and a small stimulated emission cross-section. In order to achieve an efficient absorption of the pump radiation and a high gain, it is advantageous to realize an amplifier arrangement with as many passes through the disks as possible.

Figure 18:
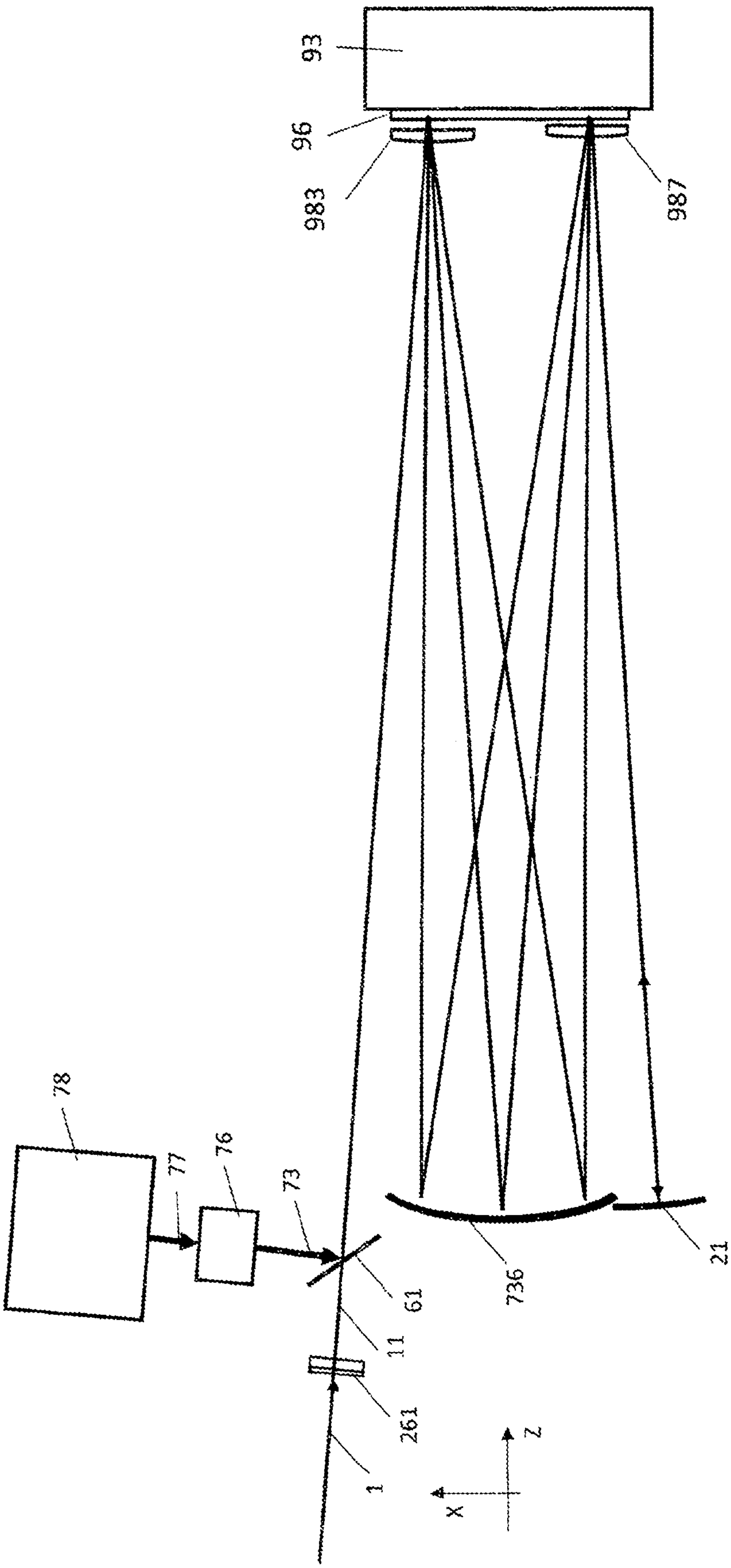
FIG. 18 shows a further amplifier arrangement according to FIG. 17, which uses the reflector mirror as shown in FIG. 2.

FIG. 18 shows a corresponding embodiment that uses a further mirror 21. The mirror 21 is coated highly reflectively for the pump radiation 73 and the laser beam 11. The mirror 21 can, for example, have the same radius of curvature as the mirror 736. It is oriented such that the non-absorbed radiation from the pump radiation 73 and the amplified beam is reflected back and passes through the multipass cell for the second time and in an opposite direction. The absorption of the pump radiation and the gain of the laser beam are increased as a result.

Figure 19:
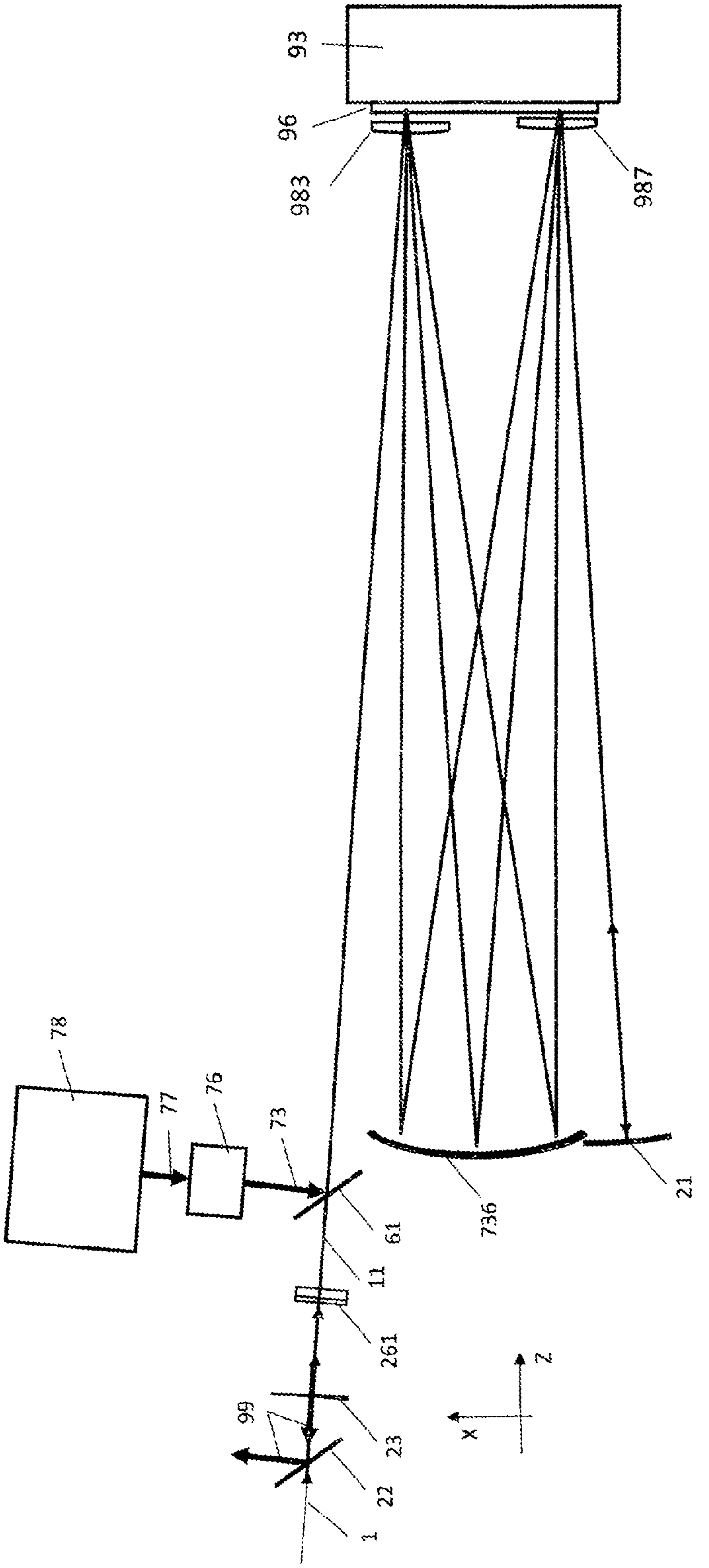
FIG. 19 shows a further amplifier arrangement, which uses the arrangement from FIG. 18, having additional components for separating an input beam and an amplified beam.

Assuming that the input beam 1 has a linear polarization, a lambda/4 retardation plate 23 and a polarizer 22 are used, as is illustrated in FIG. 19, for separating the input beam 1 and the amplified beam 99. The input beam 1 has a p-polarization and passes through the polarizer 22. Downstream of the lambda/4 retardation plate 23, the beam 11 to be amplified has a circular polarization. After passing through the multipass cell twice, the amplified beam 99 passes through the lambda/4 retardation plate. The amplified beam 99 then has a linear s-polarization that is perpendicular to the polarization of the input beam 1. As a result, the amplified beam 99 is reflected by the polarizer and thus separated from the input beam.

A Faraday isolator can also be used for separating the amplified beam 99 and the input beam 1.

Figure 20:
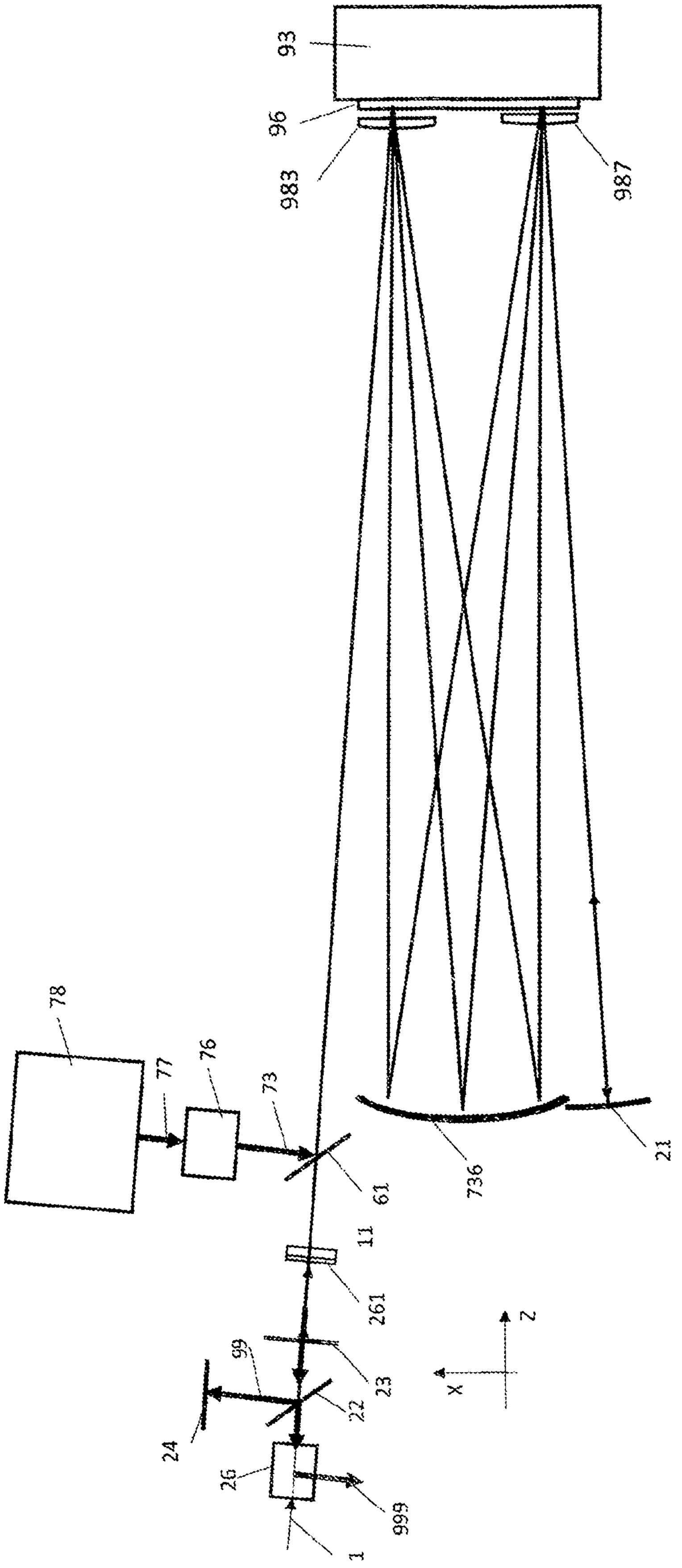
FIG. 20 shows a further amplifier arrangement according to FIG. 18 having an additional Faraday isolator.

A Faraday isolator can be used for a further increase in the number of passes and accordingly an increase in gain. FIG. 20 shows a corresponding exemplary embodiment. The p-polarized beam 1 passes through a Faraday isolator 26 and experiences no change in polarization in the process. The beam 1 then passes further through the polarizer 22 and the lambda/4 retardation plate 23 and is circularly polarized. By means of the optical unit 261, the beam is shaped and coupled into the multipass cell and amplified there. Downstream of the multipass cell, the amplified beam is reflected from the mirror 21 back into the multipass cell and amplified further. The amplified beam passes through the lambda/4 retardation plate 23 and is linearly s-polarized. It is reflected by the polarizer to form the beam 99. A mirror 24 is used, from which the s-polarized beam 99 is reflected back, passes through the lambda/4 retardation plate 23 and is coupled into the multipass cell by means of the optical unit 261. After two further passes through the multipass cell, the beam is amplified further. In this example, the amplified beam downstream of the lambda/4 retardation plate 23 has a linear p-polarization. It passes through the polarizer 22 and passes into the Faraday isolator 26 from the left-hand side in the figure. As a result, the beam 99 is s-polarized and separated from the input beam 1.

The gain medium can be e.g. a liquid cell composed of dyes, a gas cell comprising e.g. $CO_2$, a solid such as doped glass, a crystal doped e.g. with Nd ions, or Yb ions, or Tm ions, or Ho ions, or Ti ions, or a semiconductor, etc.

In the laser oscillator arrangements, the gain medium can be a semiconductor which is electrically excited by current.

Furthermore, in the case of a gaseous gain medium, the inversion for the purpose of amplification can be generated by electrical discharge.

Figure 23A:
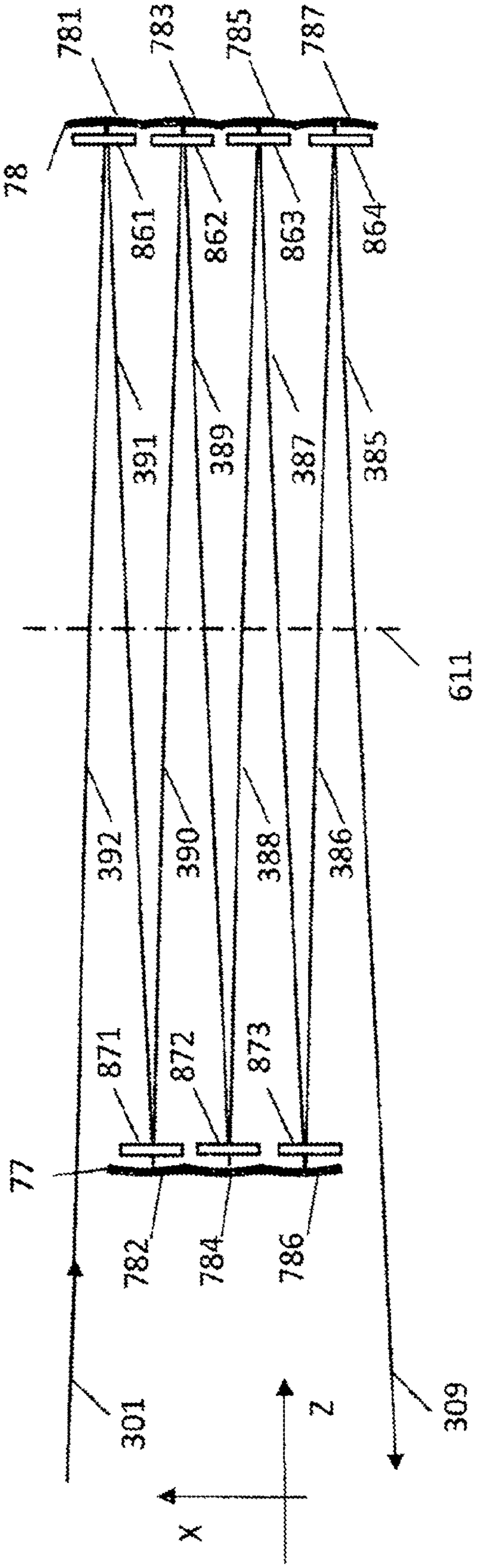
FIGS. 23*a* and 23*b* respectively show a plan view and a side view of a multipass cell having two cascaded White multipass cells.
Figure 23B:
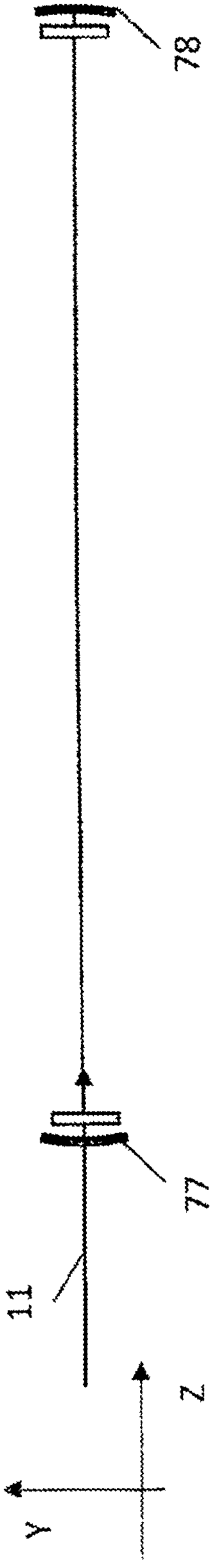

FIGS. 23*a* and 23*b* show a further exemplary embodiment according to the invention. FIG. 23*a* shows a plan view and FIG. 23*b* the side view of a multipass cell. The multipass cell consists of two cascaded White multipass cells. The first White multipass cell consists of three concave mirrors 781, 782 and 783 having the same radius of curvature. The second White multipass cell consists of three concave mirrors 785, 786 and 787 having the same radius of curvature. The mirror 784 is provided for coupling the non-absorbed pump radiation from the first White multipass cell into the second White multipass cell. The mirror 784 can, for example, have the same curvature as the other concave mirrors. The dashed line symbolizes the focal plane of the concave mirrors.

In an advantageous manner, the mirrors 782, 784 and 786 can be combined to form a mirror array 77 and the mirrors 781, 783, 785 and 787 can be combined to form a mirror array 78.

The present invention is not limited to embodiments described herein; reference should be had to the appended claims.

What is claimed is:

1. An amplifier arrangement for increasing power and energy, comprising a multipass cell and at least one gain medium, wherein the multipass cell has concavely curved mirrors and the gain medium is arranged within the multipass cell in such a way that a pump radiation passes through the gain medium multiple times and is absorbed by the gain medium and wherein a laser beam to be amplified passes through the gain medium, characterized in that the mirrors are designed and arranged such that a White multipass cell is formed and the pump radiation and the laser beam to be amplified has cross-sections at the positions at which mirrors, gain media and other optical components are arranged which is larger than where the mirrors, gain media and other optical components are not arranged, characterized in that the laser beam to be amplified is coupled into the multipass pump arrangement for amplification, and characterized in that a shaping optical unit is arranged upstream of the input coupling of the laser beam to be amplified into the multipass pump arrangement which transforms the laser beam to be amplified to an astigmatic beam.

2. The arrangement as claimed in claim 1, characterized in that the concave mirrors of the multipass cell are formed by a combination of at least one mirror and at least one lens.

3. The arrangement as claimed in claim 1, characterized in that a reflector is provided, by which the pump radiation that was not absorbed during a first pass is reflected back and passes through the multipass cell for the second time and in the opposite direction.

4. The arrangement as claimed in claim 1, characterized in that the gain medium is a thin disk, wherein a first surface of the disk is convex and is highly transmissive for the laser beam to be amplified and the pump radiation, and the second surface of the disk is coated highly reflectively for the laser beam to be amplified and the pump radiation, and the focal length of the disk is equal to the radius of curvature of a concave mirror.

5. The arrangement as claimed in claim 1, characterized in that the gain medium is a thin disk, wherein a first surface of the disk is concave and is coated highly transmissively for the laser beam to be amplified and the pump radiation, and the second surface of the disk is convex and is coated highly reflectively for the laser beam to be amplified and the pump radiation, wherein the curvatures of the surfaces are chosen such that the radii of curvature of the surfaces of the disk are approximately equal to the radius of curvature of the concave mirror.

6. The arrangement as claimed in claim 1, characterized in that the gain medium is at least one thin disk, wherein a first plane surface of the at least one thin disk is coated highly transmissively for the beam to be amplified and the pump radiation, and a second surface of the at least one thin disk is coated highly reflectively for the laser beam to be amplified and the pump radiation, wherein a positive lens is used directly upstream of the at least one thin disk, and the positive lens is coated highly transmissively for the laser beam to be amplified and the pump radiation, and the focal length of the positive lens is chosen and the positive lens is arranged in relation to the at least one thin disk such that the positive lens and the at least one thin disk together like a concave mirror reflect the pump radiation and the laser beam to be amplified, and wherein the at least one thin disk is fitted and thermally contacted on a heat sink.

7. The arrangement as claimed in claim 6, characterized in that the at least one thin disk is provided as a first thin disk and as a second thin disk, the first thin disk being fitted and thermally contacted on a first heat sink, and the second thin disk being fitted and thermally contacted on a second heat sink.

8. The arrangement as claimed in claim 6, characterized in that the positive lens of the first thin disk is mounted on a first displacement unit and the positive lens of the second thin disk is mounted on a second displacement unit.

9. The arrangement as claimed in claim 6, characterized in that the at least one thin disk is provided as a first thin disk and as a second thin disk, the positive lens of the first thin disk and the positive lens of the second thin disk are formed by a lens pair, wherein at least one of the lenses of the lens pair is mounted on a displacement unit, wherein the effective focal length of the lens pair is adjusted by a displacement of the lens such that the thermal lenses in the multipass cell are compensated for.

10. The arrangement as claimed in claim 1, characterized in that at least one optical element is provided which consists of a medium and a heating radiation source or at least one heating element which is thermally contacted with the medium, wherein the heating radiation source or the heating element emits heating radiation having a wavelength which is different than the wavelength of the pump radiation and the wavelength of the laser beam to be amplified, wherein the medium absorbs the heating radiation and is highly transmissive for the pump radiation and the beam to be amplified, and in that the distribution of the heating radiation is adjusted in accordance with a predefinition.

11. The arrangement as claimed in claim 1, characterized in that the input coupling takes place in such a way that 4N passes of the laser beam to be amplified within the White multipass cell take place, where N is an integer.

12. The arrangement as claimed in claim 1, characterized in that the astigmatic beam is approximately collimated in a plane and is convergent in a plane perpendicular thereto and has a beam waist at a central plane, wherein the central plane coincides with the focal plane of the mirror.

13. The arrangement as claimed in claim 1, characterized in that the shaping optical unit comprises at least one cylindrical lens or one mirror.

14. The arrangement as claimed in claim 1, characterized in that use is made of at least one stop and/or one stop array in the multipass cell, which have/has apertures at beam passage locations, the geometry of said apertures being adapted to the beam cross-sections of the respective beam passage locations.

15. The arrangement as claimed in claim 14, characterized in that at least one stop array is positioned in the central/focal plane or in the vicinity thereof.

16. The arrangement as claimed in claim 14, characterized in that the size of the respective apertures corresponds to 1.2 times to 2 times the beam cross-sections of a corresponding Gaussian beam.

17. The arrangement as claimed in claim 1, characterized in that the pump radiation is emitted by a beam source and is shaped by an optical unit and is coupled into the multipass pump arrangement via a dichroic mirror, wherein the mirror is highly transmissive for the laser beam to be amplified, and the laser beam to be amplified is coupled into the multipass pump arrangement by way of the mirror.

18. The arrangement as claimed in claim 17, characterized in that the dichroic mirror coaxially superimposes the beam to be amplified with the pump radiation.

19. The arrangement as claimed in claim 17, characterized in that a reflector is provided, which is a concave mirror and which reflects back pump radiation that was not absorbed during a first pass through the multipass cell, and correspondingly passes through the multipass cell during the second pass in the opposite direction.

20. The arrangement as claimed in claim 19, characterized in that the reflector is highly reflective for the amplified beam and in that the amplified beam is reflected back by the reflector and passes through the multipass cell in the opposite direction and is amplified again to form a beam.

21. The arrangement as claimed in claim 20, characterized in that a lambda/4 retardation plate and a polarizer are used for separating the input laser beam and the amplified laser beam.

22. The arrangement as claimed in claim 20, characterized in that a p-polarized or an s-polarized laser beam is guided through a Faraday isolator, which maintains the p-polarization after passage of a laser beam or becomes an s-polarized laser beam after passage, in that the polarized laser beam subsequently passes through the polarizer and the lambda/4 retardation plate and is then circularly polarized, wherein the amplified laser beam is reflected back into the multipass cell by the mirror and is amplified further and the amplified laser beam subsequently passes through the lambda/4 retardation plate and becomes s-polarized, wherein the s-polarized amplified laser beam is reflected by the polarizer to form the laser beam, wherein a mirror is used, by which the s-polarized beam is reflected back into the multipass cell and is amplified further.

23. The arrangement as claimed in claim 1, characterized in that at least one of the mirrors is a pulse-compressing GDD or GTI mirror.

24. The arrangement as claimed in claim 1, characterized in that the gain medium used is a liquid cell composed of dyes, a gas cell comprising CO2, or a solid, such as doped glass, a crystal doped with Nd ions, or Yb ions, or Tm ions, or Ho ions, or Ti ions, or a semiconductor.

25. The arrangement as claimed in claim 24, characterized in that the gain medium used is a semiconductor and a gain is generated electrically by current.

26. The arrangement as claimed in claim 24, characterized in that the gain medium is gaseous and an inversion for the purpose of amplification is generated by electrical discharge.

27. The arrangement as claimed in claim 1, characterized in that at least one further White multipass cell is disposed downstream of the White multipass cell in order to form a further multipass pump arrangement and multipass amplifier arrangement where the laser beam to be amplified has cross-sections at the positions at which mirrors, gain media and other optical components are arranged which is larger than where the mirrors, gain media and other optical components are not arranged.

28. A laser arrangement and amplifier arrangement as claimed in claim 1, characterized in that a highly reflective mirror and a partly transmissive mirror are provided, wherein the two mirrors cooperating with the multipass cell form a laser resonator in such a way that a laser oscillator is formed.

29. The arrangement as claimed in claim 28, characterized in that at least one of the two mirrors is a cylindrical mirror.

30. The arrangement as claimed in claim 28, characterized in that the two mirrors are chosen such that an astigmatic laser beam is formed within the multipass cell, wherein the astigmatic laser beam has cross-sections at the locations where optical components, such as lenses, mirrors, in particular gain media, are arranged which is larger compared to cross-sections where at the locations where optical components, such as lenses, mirrors, in particular gain media, are not arranged.

31. The arrangement as claimed in claim 28, characterized in that an optical switch that generates laser pulses is arranged in the laser oscillator.

32. The arrangement as claimed in claim 28, characterized in that at least one frequency conversion unit is arranged in the laser oscillator.

* * * * *